2,915,504

POLYVINYL BUTYRAL

Frank Berardinelli, South Orange, N.J., assignor to Celanese Corporation of America, New York, N.Y., a corporation of Delaware No Drawing. Application September 23, 1954
Serial No. 458,000

5 Claims. (Cl. 260—73)

This invention relates to the production of polyvinyl butyrals and relates particularly to the production of polyvinyl butyrals directly from polyvinyl acetate.

It is an object of this invention to provide a novel process for the production of polyvinyl butyrals directly from polyvinyl acetate.

Another object of this invention is the provision of a novel process for the production of polyvinyl butyrals from polyvinyl acetate in aqueous medium efficiently and economically without separating or isolating polyvinyl alcohol from the reaction mixture.

Other objects of this invention will be apparent from the following detailed description and claims.

In accordance with one aspect of this invention there is formed a slurry of polyvinyl acetate in an aqueous medium containing methanol and a strong acid catalyst, preferably sulfuric acid. This slurry is heated to cause deesterification of the polyvinyl acetate, and the methyl acetate thus produced is distilled off, together with excess unreacted methanol. Butyraldehyde is added to the resulting acidic aqueous solution of polyvinyl alcohol, causing the formation of a polyvinyl butyral which precipitates out from the solution, while the reaction mixture is agitated violently to prevent the separation and agglomeration of the precipitated polyvinyl butyral. Advantageously, the butyralization reaction, i.e. the reaction with butyraldehyde, is carried out in the presence of an added dispersing agent. The precipitated polyvinyl butyral is then separated from the aqueous medium, as by filtration, and then, if desired, washed with water, neutralized and dried.

In the first portion of the process, involving the deesterification of the polyvinyl acetate, the polyvinyl acetate may be present in any suitable finely-divided solid form. Very good results have been obtained by the use of small beads of polyvinyl acetate, for example, beads ½ to 2 mm. in diameter. The amount of methanol present during the deesterification reaction is insufficient to cause the unhydrolyzed polyvinyl acetate to dissolve but is preferably in excess of the amount necessary to react with all of the acetate groups of said polyvinyl acetate. Conveniently the reaction is first conducted under reflux until the boiling point of the mixture has been reduced, e.g. by about 5 to 15° C., due to the formation of the methyl acetate, following which the methyl acetate is distilled off together with methanol. In order to prevent the reaction mixture from becoming too concentrated and viscous, it is advantageous to add water to replace the methyl acetate and methanol as the latter more volatile constituents are removed.

In the butyralization portion of the process of this invention the temperature is preferably about 40 to 50° C. Lower temperatures cause a lower rate of reaction, while higher temperatures increase the danger of agglomeration of the finely-divided polyvinyl butyral particles, particularly when large amounts of unreacted butyraldehyde are present. If desired, however, the reaction temperature may be increased, e.g. to 70° or 75° C., towards the end of the reaction.

It will be seen that in the preferred process of this invention the temperature at the start of the butyralization reaction is lower than the temperature of the deesterification reaction. Advantageously, the desired reduction in temperature, after the deesterification reaction, is effected by adding cold water to the hot reaction mixture resulting from the deesterification of the polyvinyl acetate, the addition of the cold water being made prior to the addition of the butyraldehyde.

As stated, it is advantageous to have a dispersing agent agent present during the butyralization reaction. A very effective dispersing agent for use in the process of this invention is sodium lauryl sulfate, sold in admixture with other sodium sulfates of long chain fatty alcohols under the name of "Duponol ME." Examples of other dispersing agents which may be employed are gelatine, methyl cellulose, long chain alkyl benzene or naphthalene sulfonates such as sodium dodecyl benzene sulfonate, or mixtures of any of the above dispersing agents. The concentration of dispersing agent is conveniently about 2–6% based on the weight of the polyvinyl acetate. Advantageously, the degree of agitation and amount of dispersing agent are such that the size of the precipitated polyvinyl butyral particles is about 10 to 40 mesh (U.S. standard).

The process of this invention is advantageously carried out at atmospheric pressure, but subatmospheric or superatmospheric pressures may be employed for all or part of the process if desired. Thus, the deesterification reaction may be carried out at superatmospheric pressure in order to increase the rate of reaction, while the butyralization reaction may be conducted under reflux at subatmospheric pressure.

The following example is given to illustrate this invention further.

*Example*

A slurry consisting of 100 parts by weight of polyvinyl acetate, in the form of beads of 20 to 30 mesh (U.S. standard) particle size, 116 parts by weight of methanol, 184 parts by weight of water and 33.5 parts by weight of 96.6% sulfuric acid is refluxed for two hours at atmospheric pressure. During this period the temperature of the boiling reaction mixture drops from 78° C. to 66° C. and the polymer dissolves entirely. Thereafter, the mixture is heated at the boil for a further period of 1 hour. During this 1 hour period methyl acetate and methanol distill off and are replaced, as they distill off, by an equal volume of water, i.e. 205 parts by weight of water, while the temperature of the reaction mixture rises to 95° C.

Next a mixture of 665 parts by weight of cold water, whose temperature is about 14° C., and 5.8 parts by weight of "Duponol ME" are added to the hot reaction mixture, lowering its temperature to 48° C., and 47.5 parts by weight of butyraldehyde are then added in a steady stream over a period of 4 minutes while the mixture is stirred rapidly. The agitation of the mixture which now contains finely-divided particles of partial polyvinyl butyral is continued for 1½ hours, while the temperature is maintained at 43 to 48° C. The deesterification and butyralization steps are carried out in a single reaction vessel. The resulting aqueous slurry of polyvinyl butyral is removed from the reaction vessel and the polyvinyl butyral particles are filtered off, washed three times with water having a temperature of 30° C. and dried in a hot air oven at 47° C.

Analysis of the product shows a hydroxyl content, expressed as the proportion by weight of polyvinyl alcohol, of 11.6%, an acetate content, expressed as the proportion by weight of polyvinyl acetate, of 0.9%, and a butyral content, expressed as the proportion by weight of polyvinyl butyral, of 87.5%.

It is to be understood that the foregoing detailed description is merely given by way of illustration and that many variations may be made therein without departing from the spirit of my invention.

Having described my invention, what I desire to secure by Letters Patent is:

1. Process for the production of polyvinyl butyral which comprises heating a slurry of solid polyvinyl acetate in a non-solvent therefor comprising water and methanol in the presence of a strong acid catalyst to produce methyl acetate by the deesterification of said polyvinyl acetate, distilling off said methyl acetate from the resulting solution, adding water to said solution during the distillation to replace the distilled material, cooling said solution to a temperature not above about 50° C. by adding water at a lower temperature thereto, adding butyraldehyde to said cooled solution to cause the precipitation therefrom of a polyvinyl butyral in the form of fine particles, and separating the polyvinyl butyral particles from said solution.

2. Process for the production of polyvinyl butyral which comprises heating a slurry of solid polyvinyl acetate in a non-solvent therefor comprising water and methanol in the presence of sulfuric acid to produce methyl acetate by the deesterification of said polyvinyl acetate, distilling off said methyl acetate and methanol from the resulting solution, adding water to said solution during the distillation to replace the distilled material, cooling said solution to a temperature not above about 50° C. by adding water at a lower temperature thereto, adding butyraldehyde to said cooled solution and agitating said solution in the presence of a dispersing agent and at a temperature not above about 50° C. to cause the precipitation from said solution of fine particles of a polyvinyl butyral, continuing said reaction, while agitating, and separating the polyvinyl butyral particles from said solution.

3. Process for the production of polyvinyl butyral which comprises heating a slurry of solid polyvinyl acetate in a non-solvent therefor comprising water and methanol in the presence of sulfuric acid to produce methyl acetate by the deesterification of said polyvinyl acetate, distilling off said methyl acetate and methanol from the resulting solution, adding water to said solution during the distillation to replace the distilled material, cooling said solution to a temperature of about 40 to 50° C. adding butyraldehyde to said cooled solution and agitating said solution in the presence of a dispersing agent and at a temperature of about 40 to 50° C. to cause the precipitation from said solution of fine particles of a polyvinyl butyral, continuing said reaction, while agitating, and separating the polyvinyl butyral particles from said solution.

4. Process as set forth in claim 2 in which the dispersing agent comprises sodium lauryl sulfate.

5. Process which comprises heating a slurry of about 100 parts by weight of polyvinyl acetate, 116 parts by weight of methanol, 184 parts by weight of water and 33.5 parts by weight of 96.6% sulfuric acid for about 2 hours under reflux, distilling off methyl acetate, formed during the reaction, and methanol while adding water to replace the distilled material until the temperature of the reaction mixture rises to about 95° C., cooling the reaction mixture to a temperature of about 48° C. by adding about 665 parts by weight of cold water and about 5.8 parts by weight of a dispersing agent comprising sodium lauryl sulfate thereto, adding about 47.5 parts by weight of butyraldehyde and agitating the resulting mixture for about 1½ hours at a temperature of about 43 to 48° C.

References Cited in the file of this patent

UNITED STATES PATENTS

| | | |
|---|---|---|
| 2,227,997 | Berg | Jan. 7, 1941 |
| 2,457,261 | Morrison et al. | Dec. 28, 1948 |

FOREIGN PATENTS

| | | |
|---|---|---|
| 903,576 | France | Jan. 22, 1945 |
| 895,980 | Germany | Nov. 9, 1953 |